US009507665B2

United States Patent
Chiu

(10) Patent No.: US 9,507,665 B2
(45) Date of Patent: Nov. 29, 2016

(54) COMPUTING DEVICE AND METHOD FOR ACCESSING BIOS USING MIDDLEWARE CONTROLLER OF THE COMPUTING DEVICE

(71) Applicant: HON HAI PRECISION INDUSTRY CO., LTD., New Taipei (TW)

(72) Inventor: Chia-Lang Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 304 days.

(21) Appl. No.: 14/093,542

(22) Filed: Dec. 2, 2013

(65) Prior Publication Data

US 2014/0173267 A1  Jun. 19, 2014

(30) Foreign Application Priority Data

Dec. 17, 2012  (TW) .............................. 101147734 A

(51) Int. Cl.
G06F 11/14 (2006.01)
G06F 11/10 (2006.01)

(52) U.S. Cl.
CPC ....... *G06F 11/1417* (2013.01); *G06F 11/1004* (2013.01)

(58) Field of Classification Search
CPC .......... G06F 11/1448; G06F 11/1417; G06F 11/1469
See application file for complete search history.

(56) References Cited

U.S. PATENT DOCUMENTS

| 6,185,696 | B1 | 2/2001 | Noll | |
|---|---|---|---|---|
| 7,600,143 | B1* | 10/2009 | Neuman | G06F 7/06 713/500 |
| 7,668,612 | B1* | 2/2010 | Okkonen | G06F 8/65 700/95 |
| 2003/0005277 | A1 | 1/2003 | Harding et al. | |
| 2006/0153544 | A1* | 7/2006 | Ando | G11B 20/1217 386/264 |
| 2008/0148038 | A1* | 6/2008 | Abe | G06F 11/073 713/2 |
| 2009/0290427 | A1 | 11/2009 | Park | |
| 2010/0115256 | A1* | 5/2010 | Challener | G06F 8/66 713/2 |
| 2011/0096601 | A1* | 4/2011 | Gavens | G11C 11/5628 365/185.09 |
| 2012/0011393 | A1* | 1/2012 | Roberts | G06F 11/1417 714/6.3 |

FOREIGN PATENT DOCUMENTS

| CN | 1595372 A | 3/2005 |
|---|---|---|
| CN | 101017442 A | 8/2007 |
| CN | 101661378 A | 3/2010 |
| CN | 102253866 A | 11/2011 |
| EP | 2124151 A1 | 11/2009 |
| WO | 2006009290 A1 | 1/2006 |

OTHER PUBLICATIONS

Guo Peng, Xie Guang-jun, Design of BIOS software based on X86CoC, Journal of Hefei University of Technology vol. 34101-104 No. 2 Feb. 23, 2011 pp. 101-104 Published in China.

* cited by examiner

*Primary Examiner* — Nitin Patel
*Assistant Examiner* — Kevin Stewart
(74) *Attorney, Agent, or Firm* — Zhigang Ma

(57) ABSTRACT

A computing device includes a first BIOS chip and a second BIOS chip. Each of the first and second BIOS chips store a BIOS image and comprises a plurality of data blocks to store BIOS data of the BIOS image. During a booting process of the computing device, the BIOS data stored in odd data blocks of the first BIOS chip and the BIOS data stored in even data blocks of the second BIOS chip are respectively accessed and are stored in a cache of a middleware controller. A processor of the computing device accesses the BIOS data from the cache of the middleware controller during the booting process.

16 Claims, 4 Drawing Sheets

COMPUTING DEVICE AND METHOD FOR ACCESSING BIOS USING MIDDLEWARE CONTROLLER OF THE COMPUTING DEVICE

BACKGROUND

1. Technical Field

Embodiments of the present disclosure relate to method of accessing basic input output system (BIOS) of computing device, and particularly to a computing device and method for accessing BIOS using a middleware controller of the computing device.

2. Description of Related Art

A basic input/output system (BIOS) is an important program executed during a booting process of computing devices, such as computers and servers. During the booting process, a processor of the computing device will access the BIOS from a BIOS chip. At this time, most hardware components of the computing device are not working. In a traditional BIOS access method, when data error occurs during access of the BIOS, the data cannot be recovered in time, which may cause the computing device to be unstable. Further, since many computing devices only have a single BIOS chip, the traditional method for accessing the BIOS from the single BIOS chip is inefficient. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
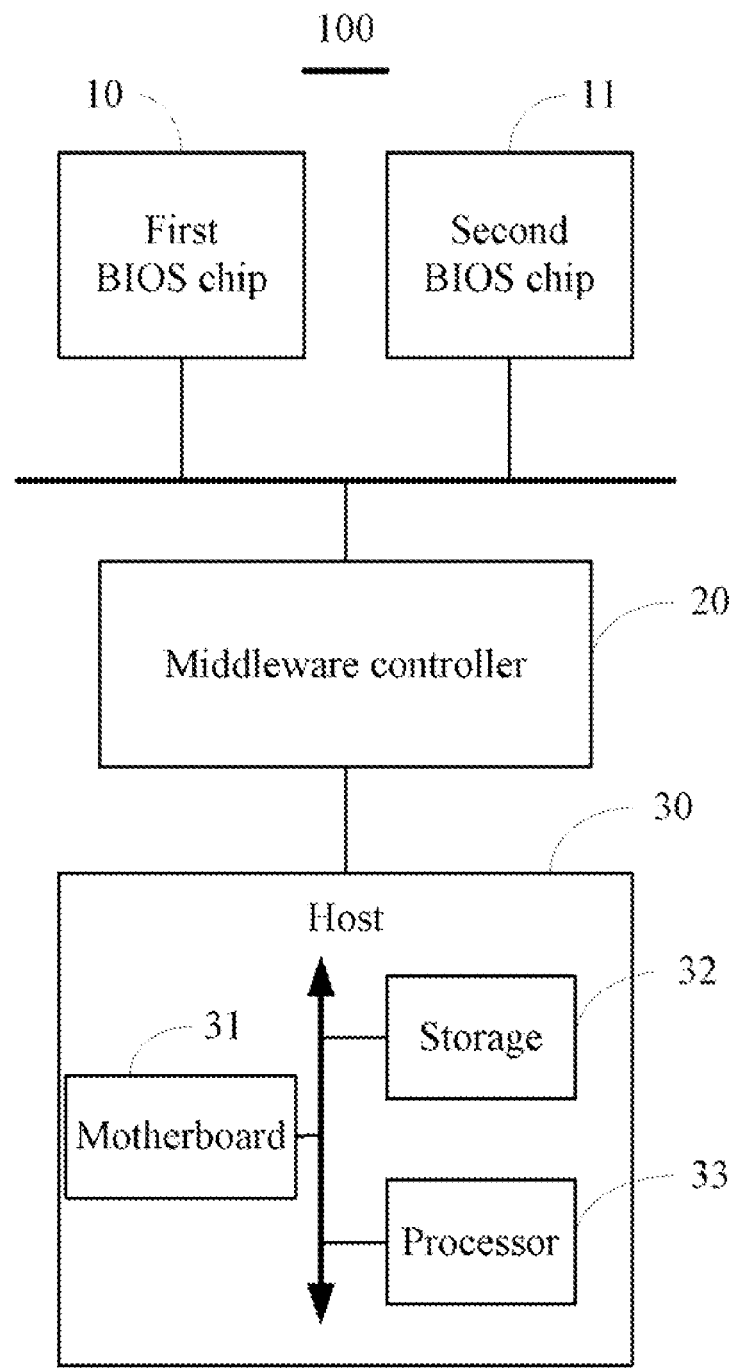
FIG. 1 is a schematic block diagram illustrating one embodiment of a computing device.

FIG. 1 is a schematic block diagram illustrating one embodiment of a computing device 100. The computing device 100 can be a personal computer or a server. The computing device 100 includes a first basic input output system (BIOS) chip 10, a second BIOS chip 11, a middleware controller 20, and a host 30. Each of the first and second BIOS chips 10, 11 stores a BIOS image, to provide a dual BIOS function for the computing device. The host 30 includes a motherboard 11, a storage 32, a processor 33, and other relevant components of the computing device 100. The middleware controller 20 can independently work without powering the host 30.

In this embodiment, the middleware controller 20 is a filed programmable gate array (FPGA) chip or a baseboard management controller (BMC). The first BIOS chip 10, the second BIOS chip 11, the middleware controller 20 and the host 30 are directly or indirectly connected with each other for data transmission and interaction. Each of the first BIOS chip 10 and the second BIOS chip 11 may be, for example, a flash chip, an erasable programmable read only memory (EPROM) chip, or an electrically erasable programmable read only memory (EEPROM) chip.

Figure 2:
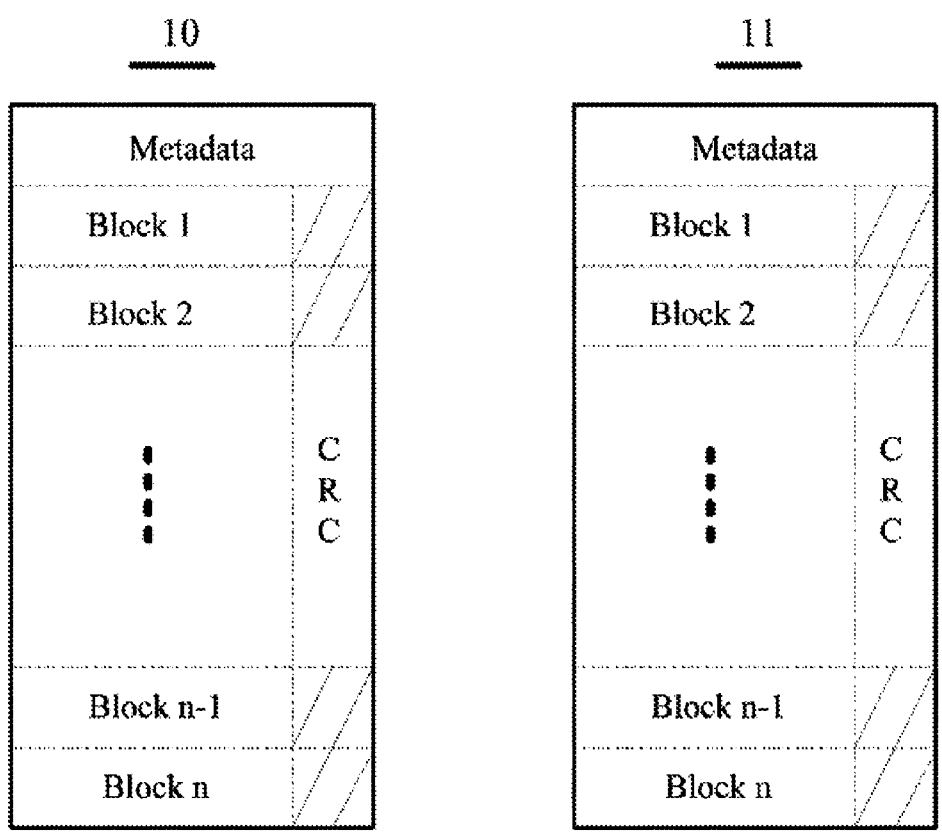
FIG. 2 shows a schematic view of a plurality of data block of a first basic input output system (BIOS) chip and a second BIOS chip of FIG. 1.

FIG. 2 shows that each of the first and second BIOS chips 10, 11 includes a plurality of data blocks. The plurality of data blocks includes n first data blocks (e.g., block 1, block 2 ... block n) and a second data block. The n first data blocks are configured to store BIOS data of the computing device. Each first data block includes a cyclic redundancy check (CRC) column that stores a CRC code. The CRC code is calculated according to the BIOS data stored in a corresponding first data block when the BIS data is written into the first data block. The second data block stores a metadata which describes basic information of the BIOS image of the first and second BIOS chips 10, 11. The metadata includes a signature indicating a format of the BIOS image, a timestamp indicating time information when the BIOS image is written into the first BIOS chip 10 or the second BIOS chip, and a size of the BIOS image.

Figure 3:
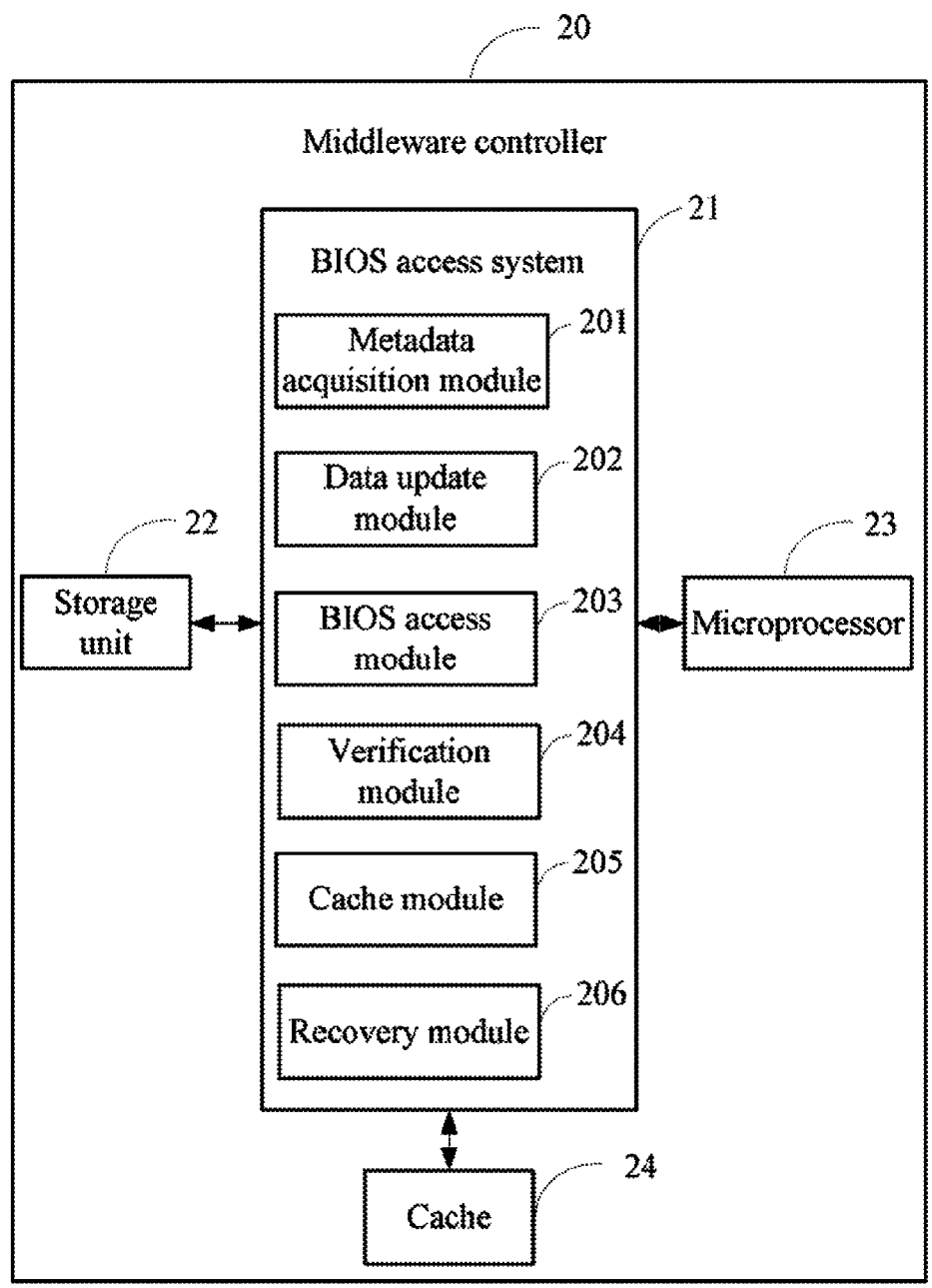
FIG. 3 is block diagram of a middleware controller of FIG. 1 including a plurality of functional modules

FIG. 3 shows a block diagram of the middleware controller 20. The middleware controller 20 accesses the BIOS image of the first and second BIOS chips 10, 11 during a booting process of the computing device 100. The middleware controller 20 includes a BIOS access system 21, a storage unit 22, a microprocessor 23, and a cache 24. The BIOS access system 21 includes a plurality of functional modules. Each of the functional modules may include a plurality of programs in the form of one or more computerized instructions stored in the storage unit 22 and executed by the microprocessor 23 to perform operations of the middleware controller 20. In the embodiment, the BIOS access system 21 includes a metadata acquisition module 201, a data update module 202, a BIOS access module 203, a verification module 204, a cache module 205, and a recovery module 206.

In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

Figure 4:
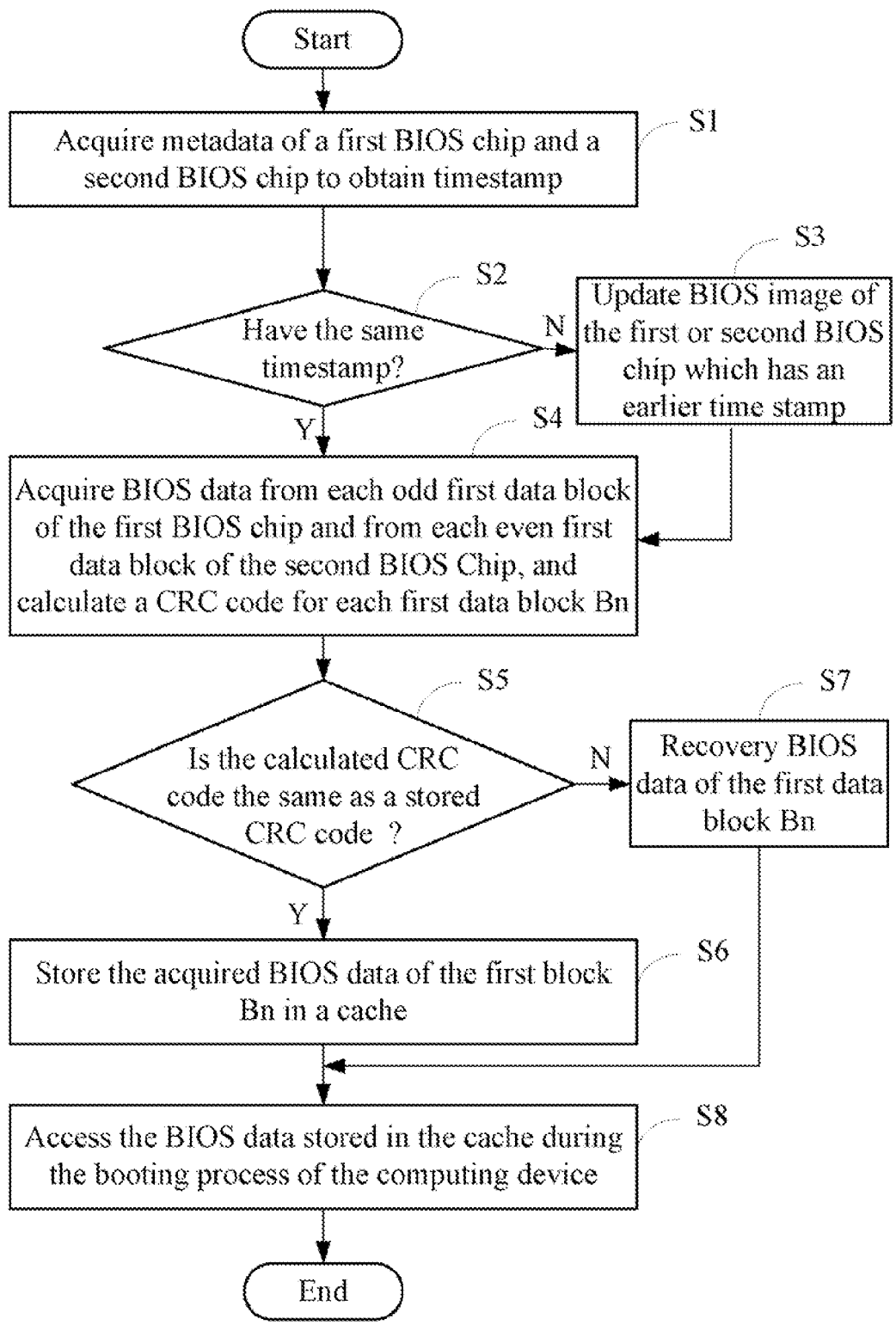
FIG. 4 is a flowchart of one embodiment of a method for accessing the BIOS of the computing device of FIG. 1.

FIG. 4 shows a flowchart of one embodiment of a BIOS access method device implemented by the functional modules of the BIOS access system 21 of FIG. 3. Depending on the embodiment, additional steps may be added, others removed, and the ordering of the steps may be changed.

In step S1, when the computing device 100 is powered on to boot the computing device 100, the metadata acquisition module 201 acquires the metadata of the first BIOS chip 10 and the second BIOS chip 11.

In step S2, the data update module 202 determines whether the timestamp of the first BIOS chip 10 is the same as the timestamp of the second BIOS chip 11. If the timestamp of the first BIOS chip 10 is the same as the timestamp of the second BIOS chip 11, step S4 is implemented. Otherwise, if the timestamp of the first BIOS chip 10 is different from the timestamp of the second BIOS chip 11 step S3 is implemented.

In step S3, the data update module 202 updates the BIOS image of one of the first and second BIOS chips 10, 11 which has an earlier timestamp according to the BIOS image of another of the first and second BIOS chips 10, 11 which has a latest timestamp.

In this embodiment, if the timestamp of the BIOS image of the first BIOS chip 10 is earlier than the timestamp of the BIOS image of the second BIOS chip 11, the data update module 202 first deletes the BIOS image from the first BIOS chip 10, and then copies the BIOS image from the second BIOS chip 11 to the first BIOS chip 10, to update the BIOS image of the first BIOS chip 10. Accordingly, if the timestamp of the BIOS image of the second BIOS chip 11 is earlier than the timestamp of the BIOS image of the first BIOS chip 10, the data update module 202 first deletes the BIOS image from the second BIOS chip 11, and then copies the BIOS image from the first BIOS chip 10 to the second BIOS chip 11, to update the BIOS image of the second BIOS chip 11. Thus, when the BIOS image of the computing device 100 needs to be updated, a user only needs to update the BIOS image of one of the first and second BIOS chips 10, 11, because the BIOS image of another of the first and second BIOS chips 10, 11 can be automatically updated by the data update module 202.

In addition, when the first BIOS chip 10 does not have the BIOS image or the BIOS image of the first BIOS chip 10 has been damaged, the data update module 202 copies the BIOS image from the second BIOS chip 11 to the first BIOS chip 10. When the second BIOS chip 11 does not have the BIOS image or the BIOS image of the second BIOS chip 11 has been damaged, the data update module 202 copies the BIOS image from the first BIOS chip 10 to the second BIOS chip 11.

In step S4, the BIOS access module 203 acquires BIOS data from each odd first data block of the first BIOS chip 10 and from each even first data block of the second BIOS Chip 10, and calculates a CRC code for each first data block Bn according to the acquired BIOS data of the first data block Bn. The first data block Bn can be either the odd first data block of the first BIOS chip 10 or the even first data block of the second BIOS chip 11.

In step S5, the verification module 204 verifies whether the calculated CRC code is the same as the CRC code stored in the first data block Bn. If the calculated CRC code is the same as the CRC code stored in the first data block Bn, step S6 is implemented. Otherwise, if the calculated CRC code is different from the CRC code stored in the first data block Bn, step S7 is implemented.

In step S6, the cache module 205 temporally stores the acquired BIOS data of the first block Bn in the cache 24, the procedure goes to step S8.

In step S7, the recovery module 206 recovers the BIOS data of the first block Bn. In this embodiment, when the calculated CRC code is different from the CRC code stored in the first data block Bn, it indicates that data error of the first data block Bn occurs. If the first data block Bn is the odd first data block of the first BIOS chip 10, the recovery module 206 recovers the BIOS data and the CRC code of first data block Bn of the first BIOS chip 10 according to the BIOS data and the CRC code of first data block Bn of the second BIOS chip 11. In contrast, if the first data block Bn is the even first data block of the second BIOS chip 11, the recovery module 206 recovers the BIOS data and the CRC code of first data block Bn of the second BIOS chip 11 according to the BIOS data and the CRC code of first data block Bn of the first BIOS chip 10. Then the recovered BIOS data is temporally stored in the cache 24.

In step S8, the processor 33 of the computing device 100 accesses the BIOS data stored in the cache 24 of the middleware controller 20 during the booting process of the computing device 100.

In view of the above, the BIOS access of the computing device 100 is performed using the middleware controller 20. When data error occurs during the booting process of the computing device 100, the BIOS data can be automatically recovered. Thus, the stability of the computing device is improved.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
a first basic input output system (BIOS) chip and a second BIOS chip, each of the first and second BIOS chips storing a BIOS image and comprising a plurality of first data blocks configured to store BIOS data of the BIOS image and a second data block configured to store a metadata that describes basic information of the BIOS image, each first data block storing a cyclic redundancy check (CRC) code corresponding to the BIOS data stored in the first data block;
a middleware controller acquiring the BIOS data from first BIOS chip and the second BIOS chip during a booting process of the computing device, and temporally storing the acquired BIOS data in a cache of the middleware controller; and
a processor accessing the BIOS data from the cache of the middleware controller during the booting process of the computing device;
wherein the middleware controller comprises:
a microprocessor;
one or more software programs executable by the microprocessor, the one or more software programs comprising:
a BIOS access module that acquires BIOS data from each odd first data block of the first BIOS chip and from each even first data block of the second BIOS Chip, and calculates a CRC code for each first data block Bn according to the acquired BIOS data of the first data block Bn, wherein the first data block Bn is either the odd first data block of the first BIOS chip or the even first data block of the second BIOS chip;
a verification module that verifies whether the calculated CRC code is the same as the CRC code stored in the first data block Bn;
a cache module that temporarily stores the acquired BIOS data of the first block Bn in the cache, when the calculated CRC code is the same as the CRC code stored in the first data block Bn; and
a recovery module that recovers the BIOS data and the CRC code of the first block Bn when the calculated CRC code is different from the CRC code stored in the first data block Bn, and temporarily stores the recovered BIOS data in the cache.

2. The computing device according to claim 1, wherein when the first data block Bn is the odd first data block of the first BIOS chip, the recovery module recovers the BIOS data and the CRC code of first data block Bn of the first BIOS chip according to the BIOS data and the CRC code of first data block Bn of the second BIOS chip; when the first data block Bn is the even first data block of the second BIOS chip, the recovery module recovers the BIOS data and the CRC code of first data block Bn of the second BIOS chip according to the BIOS data and the CRC code of first data block Bn of the first BIOS chip.

3. The computing device according to claim 1, wherein the metadata comprises a timestamp indicating time information when the BIOS image is written into the first BIOS chip or the second BIOS chip.

4. The computing device according to claim 3, wherein the metadata further comprises a signature indicating a format of the BIOS image, and a size of the BIOS image.

5. The computing device according to claim 3, wherein the one or more software programs further comprise:
   a metadata acquisition module that acquires the metadata of the first BIOS chip and the second BIOS chip, when the computing device is powered on; and
   a data update module that determines whether the timestamp of the BIOS image of the first BIOS chip is the same as the timestamp of the BIOS image of the second BIOS chip, and updates the BIOS image of one of the first and second BIOS chips which has an earlier timestamp according to the BIOS image of another of the first and second BIOS chips which has a latest timestamp when the timestamp of the BIOS image of the first BIOS chip is different from the timestamp of the BIOS image of the second BIOS chip.

6. The computing device according to claim 5, wherein when the timestamp of the BIOS image of the first BIOS chip is earlier than the timestamp of the BIOS image of the second BIOS chip, the data update module deletes the BIOS image from the first BIOS chip and copies the BIOS image from the second BIOS chip to the first BIOS chip; when the timestamp of the BIOS image of the second BIOS chip is earlier than the timestamp of the BIOS image of the first BIOS chip, the data update module deletes the BIOS image from the second BIOS chip and copies the BIOS image from the first BIOS chip to the second BIOS chip.

7. The computing device according to claim 5, wherein when the first BIOS chip does not have the BIOS image or the BIOS image of the first BIOS chip has been damaged, the data update module further copies the BIOS image from the second BIOS chip to the first BIOS chip; when the second BIOS chip does not have the BIOS image or the BIOS image of the second BIOS chip has been damaged, the data update module further copies the BIOS image from the first BIOS chip to the second BIOS chip.

8. The computing device according to claim 1, wherein the middleware controller is a field programmable gate array (FPGA) chip or a baseboard management controller (BMC).

9. A method for accessing basic input output system (BIOS) of a computing device, the computing device comprising a middleware controller, a first BIOS chip and a second BIOS chip, each of the first and second BIOS chips storing a BIOS image and comprising a plurality of first data blocks configured to store BIOS data of the BIOS image, the method comprising:
   acquiring the BIOS data from first BIOS chip and the second BIOS chip during a booting process of the computing device using the middleware controller, and temporally storing the acquired BIOS data in a cache of the middleware controller; and
   accessing the BIOS data from the cache of the middleware controller using a processor of the computing device during the booting process of the computing device
   the step of acquiring the BIOS data from first BIOS chip and the second BIOS chip comprises:
   acquiring BIOS data from each odd first data block of the first BIOS chip and from each even first data block of the second BIOS Chip;
   calculating a CRC code for each first data block Bn according to the acquired BIOS data of the first data block Bn, wherein the first data block Bn is either the odd first data block of the first BIOS chip or the even first data block of the second BIOS chip;
   verifying whether the calculated CRC code is the same as a CRC code prestored in the first data block Bn;
   storing the acquired BIOS data of the first block Bn in the cache, when the calculated CRC code is the same as the CRC code prestored in the first data block Bn; and
   recovering the BIOS data and the CRC code of the first block Bn when the calculated CRC code is different from the CRC code prestored in the first data block Bn, and temporarily storing the recovered BIOS data in the cache.

10. The method according to claim 9, wherein step of recovering the BIOS data and the CRC code of the first block Bn comprises;
    recovering the BIOS data and the CRC code of first data block Bn of the first BIOS chip according to the BIOS data and the CRC code of first data block Bn of the second BIOS chip, when the first data block Bn is the odd first data block of the first BIOS chip, the recovery module; or
    recovering the BIOS data and the CRC code of first data block Bn of the second BIOS chip according to the BIOS data and the CRC code of first data block Bn of the first BIOS chip, when the first data block Bn is the even first data block of the second BIOS chip, the recovery module.

11. The method according to claim 9, wherein each of the first and second BIOS chips further comprise a second data block that stores a metadata which describes basic information of the BIOS image, the metadata comprises a timestamp indicating time information when the BIOS image is written into the first BIOS chip or the second BIOS chip.

12. The method according to claim 11, wherein the metadata further comprises a signature indicating a format of the BIOS image, and a size of the BIOS image.

13. The method according to claim 11, further comprising:
    acquiring the metadata of the first BIOS chip and the second BIOS chip using the middleware controller, when the computing device is powered on; and
    determining whether the timestamp of the BIOS image of the first BIOS chip is the same as the timestamp of the BIOS image of the second BIOS chip using the middleware controller; and
    updating the BIOS image of one of the first and second BIOS chips which has an earlier timestamp according to the BIOS image of another of the first and second BIOS chips which has a latest timestamp using the middleware controller, when the timestamp of the BIOS image of the first BIOS chip is different from the timestamp of the BIOS image of the second BIOS chip.

14. The method according to claim 13, wherein the step of updating the BIOS image of one of the first and second BIOS chips comprises:
    deleting the BIOS image from the first BIOS chip and copying the BIOS image from the second BIOS chip to the first BIOS chip when the timestamp of the BIOS image of the first BIOS chip is earlier than the timestamp of the BIOS image of the second BIOS chip; and deleting the BIOS image from the second BIOS chip and copying the BIOS image from the first BIOS chip to the second BIOS chip, when the timestamp of the BIOS image of the second BIOS chip is earlier than the timestamp of the BIOS image of the first BIOS chip.

15. The method according to claim 13, further comprising:

copying the BIOS image from the second BIOS chip to the first BIOS chip, when the first BIOS chip does not have the BIOS image or the BIOS image of the first BIOS chip has been damaged; and copying the BIOS image from the first BIOS chip to the second BIOS chip when the second BIOS chip does not have the BIOS image or the BIOS image of the second BIOS chip has been damaged.

16. The method according to claim 9, wherein the middleware controller is a field programmable gate array (FPGA) chip or a baseboard management controller (BMC).

* * * * *